(12) United States Patent
Kim

(10) Patent No.: US 7,521,148 B2
(45) Date of Patent: Apr. 21, 2009

(54) CAP ASSEMBLY AND SECONDARY BATTERY UTILIZING THE SAME

(75) Inventor: Tae-Yong Kim, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 636 days.

(21) Appl. No.: 10/887,899

(22) Filed: Jul. 12, 2004

(65) Prior Publication Data

US 2005/0118495 A1   Jun. 2, 2005

(30) Foreign Application Priority Data

Nov. 29, 2003   (KR) ..................... 10-2003-0086085

(51) Int. Cl.
*H01M 2/12* (2006.01)
*H01M 2/08* (2006.01)

(52) U.S. Cl. .............. 429/53; 429/54; 429/55; 429/56; 429/175; 429/185

(58) Field of Classification Search ............ 429/175, 429/53–56, 185
See application file for complete search history.

(56) References Cited

U.S. PATENT DOCUMENTS

| | | | |
|---|---|---|---|
| 4,190,702 A * | 2/1980 | Pun et al. ................ | 429/4 |
| 5,532,081 A * | 7/1996 | DePalma et al. ........... | 429/171 |
| 6,132,900 A | 10/2000 | Yoshizawa et al. | |
| 6,168,879 B1 | 1/2001 | Kim | |
| 6,355,372 B2 | 3/2002 | Yamahira et al. | |
| 6,451,473 B1 * | 9/2002 | Saito et al. ............... | 429/94 |
| 2001/0046620 A1 * | 11/2001 | Inoue et al. .............. | 429/54 |
| 2003/0118892 A1 * | 6/2003 | Ray et al. ................ | 429/82 |
| 2005/0244706 A1 * | 11/2005 | Wu et al. ................ | 429/56 |

FOREIGN PATENT DOCUMENTS

| | | | |
|---|---|---|---|
| JP | 8-339821 | | 12/1996 |
| JP | 10172528 A | * | 6/1998 |
| JP | 11-025935 | | 1/1999 |
| JP | 11-219692 | | 8/1999 |
| JP | 11-329407 | | 11/1999 |
| JP | 2003-045395 | | 2/2003 |

OTHER PUBLICATIONS

Machine translation of JP 10-172528 relied upon for the rejection.*

* cited by examiner

*Primary Examiner*—Patrick Ryan
*Assistant Examiner*—Eugenia Wang
(74) *Attorney, Agent, or Firm*—Stein, McEwen & Bui, LLP

(57) ABSTRACT

A secondary battery includes an electrode assembly realized by layering and/or winding an anode, a cathode, and a separator; a case having a space into which the electrode assembly is inserted; and a cap assembly including a cap plate connected to the case inside of which the electrode assembly is mounted, a gasket insulating the cap plate from the case, and a safety assembly having a shock absorbing unit extending into the case from the gasket or the cap plate and that has a space for absorbing pressure, and having a vent member supported in a distal end of the shock absorbing unit and that is damaged when an internal pressure of the secondary battery exceeds a predetermined pressure.

36 Claims, 4 Drawing Sheets

CAP ASSEMBLY AND SECONDARY BATTERY UTILIZING THE SAME

CROSS-REFERENCE TO RELATED APPLICATION

This application claims the benefit of Korean Application No. 2003-86085, filed Nov. 29, 2003, in the Korean Intellectual Property Office, the disclosure of which is incorporated herein by reference.

BACKGROUND OF THE INVENTION

1. Field of the Invention

The present invention relates to a secondary battery. More particularly, the present invention relates to a cap assembly that improves a safety device for preventing explosion of a secondary battery as a result of an increase in an internal pressure of the same, and to a secondary battery utilizing the same.

2. Description of the Related Art

A secondary battery allows recharging and may have a small size with a large recharging capacity. The main types of secondary batteries include a nickel hydrogen (Ni—H) battery, a lithium (Li) battery, and a lithium-ion (Li-ion) battery. The lithium secondary battery may be made into various shapes, with the most common shapes being cylindrical and quadrilateral, typically used for lithium-ion batteries.

In the case of the lithium-ion battery, if overcharging occurs or if there is a short between a cathode plate and an anode plate of an electrode assembly, decomposition of electrolyte occurs in which lithium salt and an organic solvent are mixed in the area of the anode plate, and leakage of lithium metal in the area of the cathode plate occurs. As a result, battery characteristics may deteriorate and an internal short may occur. There is a particular concern that gas generated during overcharging may increase an internal pressure such that the battery explodes and/or catches fire.

In order to solve the above overcharging and shorting problems of the secondary battery, a safety device is provided in the battery of a conventional can-type lithium-ion battery. The safety device uses a shut-down separator, a PTC element for performing cutoff of current when temperature increases, or a safety vent for allowing the exhaust of pressure when the pressure in the battery increases.

Examples of such a safety valve are disclosed in U.S. Pat. No. 5,985,478. and Japanese Patent No. 11-329407. The disclosed structures are such that passage apertures formed in a cathode plate undergo riveting using rivets connected to a tab in a state where an insulation member and a gasket are positioned at upper and lower areas of the cathode plate. There are limits with the use of this structure with respect to the degree to which the passage apertures are sealed. For example, in the case of large capacity secondary batteries, since a large amount of gas is generated within the battery, the degree to which the passage apertures are sealed is significantly reduced.

Another example of a safety device is disclosed in Japanese Patent No. 11-219692. The disclosed safety device disclosed uses a thin metal plate to seal holes of a cap plate. However, when the safety device receives an external physical shock, a crack generates in a safety vent. Therefore, reliability is an issue with this structure.

Japanese Patent No. JP 11-025935. discloses a safety device produced in an upper-directional prominence and depression configuration. A dual-layered metal thin plate is used in the structure, making the manufacturing process complicated and expensive.

The above mentioned safety devices do not have a mechanism to absorb pressure when internal pressure is increased by gas generated in the battery during charging and discharging. This inability to increase safety by the lack of a structure to absorb pressure is of particular concern for large capacity/high output secondary batteries, such as those used in HEVs (Hybrid Electric Vehicles).

SUMMARY OF THE INVENTION

In an aspect of the invention, there is a cap assembly that absorbs gas generated by a thermal decomposition reaction of electrolyte when pressure is within a predetermined level, and ejects the gas when the pressure exceeds the predetermined level to thereby prevent explosion of the battery.

In another aspect of the invention, there is provided a cap assembly having a safety device that may be applied to a large capacity, highly efficient secondary battery that generates a large amount of gas.

In an aspect of the invention, a cap assembly for a secondary battery includes a cap plate connected to a case inside of which an electrode assembly is mounted; a gasket insulating the cap plate from the case; and a safety assembly including a shock absorbing unit extending into the case from the gasket and having a space for absorbing pressure, and a vent member supported in a distal end of the shock absorbing unit and that is damaged when an internal pressure of the secondary battery exceeds a predetermined pressure.

The shock absorbing unit has a conical shape with a cutaway apex area and that is wide at one end and narrow at its other end, and has a plurality of creases formed thereon to allow for expansion and contraction. An elastic member is interposed between the cap plate and the vent member to be electrically connected to the same, and to elastically bias the vent member in a direction away from the cap plate.

In another aspect of the invention, a cap assembly for a secondary battery includes a cap plate connected to a case inside of which an electrode assembly is mounted; a gasket insulating the cap plate from the case; and a safety assembly including a shock absorbing unit extending into the case from the cap plate and that has a space for absorbing pressure and that is made of a conductive metal, and a vent member supported in a distal end of the shock absorbing unit and that is damaged when an internal pressure of the secondary battery exceeds a predetermined pressure.

In another of the invention, a secondary battery includes an electrode assembly realized by layering or winding an anode, a cathode, and a separator; a case having a space into which the electrode assembly is inserted; and a cap assembly including a cap plate connected to the case inside of which the electrode assembly is mounted, a gasket insulating the cap plate from the case, and a safety assembly having a shock absorbing unit extending into the case from the gasket or the cap plate and that has a space for absorbing pressure, and having a vent member supported in a distal end of the shock absorbing unit and that is damaged when an internal pressure of the secondary battery exceeds a predetermined pressure.

The shock absorbing unit is formed of a conductive metal, and the shock absorbing unit and the vent member are integrally formed.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
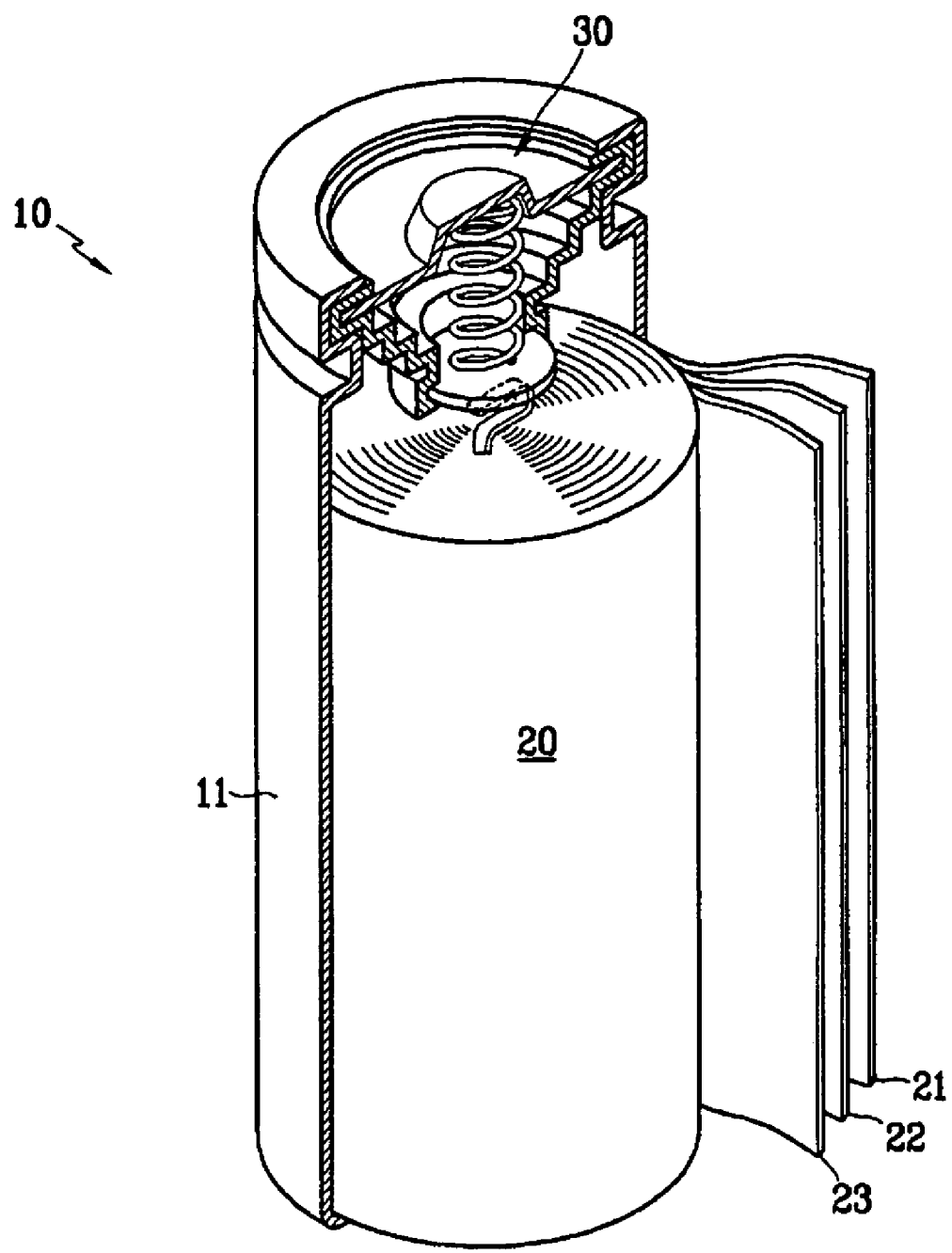
FIG. 1 is a partially cutaway perspective view of a secondary battery according to an embodiment of the invention.

Reference will now be made in detail to the embodiments of the present invention, examples of which are illustrated in the accompanying drawings, wherein like reference numerals refer to the like elements throughout. The embodiments are described below to explain the present invention by referring to the figures.

An aspect of a secondary battery 10 according to the invention is shown in FIG. 1. The secondary battery 10 includes a case 11 that has a cylindrical or hexahedron shape with an open upper region, an electrode assembly 20 inserted within the case 11, and a cap assembly 30 connected to the case 11 to seal an inner space thereof. The cap assembly 30 is electrically connected to an anode of the electrode assembly 20 (to be described below), and is insulated from the case 11.

The case 11 is made of a conductive metal material, such as aluminum or an aluminum alloy. The case 11 is not limited to the cylindrical or hexahedron shape having an inner space in which the electrode assembly 20 is mounted, and can be formed to a variety of shapes as long as a configuration is used allowing mounting of the electrode assembly 20 within the case 11.

The electrode assembly 20 is realized through a layered configuration in which a separator 22 is interposed between an anode plate 21 and a cathode plate 23. The electrode assembly 20 may also be formed into a jelly roll configuration by layering the anode plate 21, a separator 22, and a cathode plate 23, and rolling these layered elements together. In FIG. 1, the case 11 is cylindrical and the electrode assembly 20 is provided in a jelly roll configuration.

A cathode tab (not shown) of the cathode plate 23 of the electrode assembly 20 is connected to the case 11. The cap assembly 30 is connected to the case 11 as described above and includes a cap plate 31 connected to the case 11 to seal the same, and a gasket 32 insulating the case 11 from the cap assembly 31. A safety assembly is provided in the cap assembly 30 having a space 41 for absorbing internal pressure. The safety assembly damages at a predetermined pressure to allow gas to escape and prevent the secondary battery 10 from exploding and/or catching fire.

Figure 2:
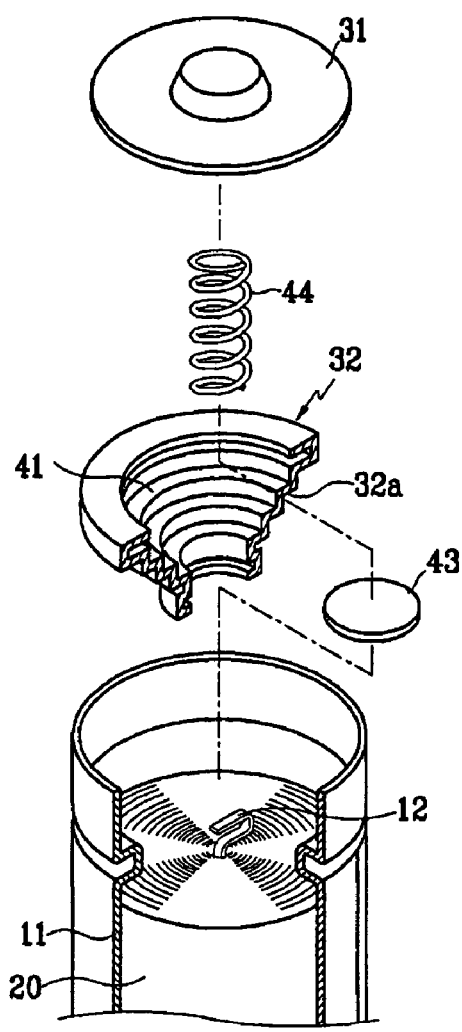
FIG. 2 is an exploded partial perspective view of a cap assembly of the secondary battery shown in FIG. 1.
Figure 3:
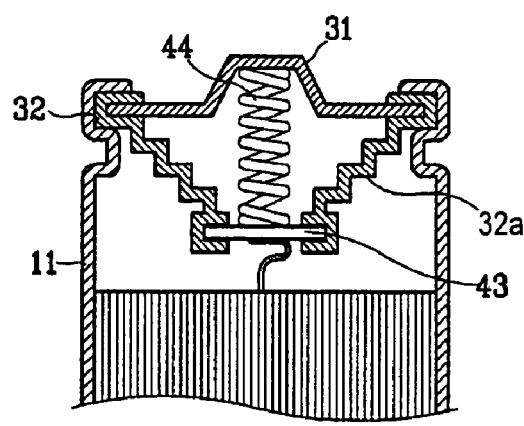
FIG. 3 is a sectional view of the cap assembly shown in FIG. 2.

The safety assembly, with reference to FIGS. 2 and 3, includes a shock absorbing unit 32a that extends inwardly from the gasket 32 and seals the cap plate 31, and a vent member 43 supported at a distal end of the shock absorbing unit 32a and damages when the internal pressure of the secondary battery 10 exceeds a predetermined pressure. Although the shock absorbing unit 32a may be formed as an integral unit with the gasket 32, the invention is not limited to this configuration.

To allow easy expansion and contraction by the action of pressure, the shock absorbing unit 32a is formed having creases in an outer circumference thereof in a stepped formation. Also, the shock absorbing unit 32a has a conical shape with a cutaway apex area that is wide at the top and narrow at the bottom. This configuration allows for easy expansion and contraction by the action of pressure.

When the gasket 32 and the shock absorbing unit 32a are integrally formed, the gasket 32 is made of rubber or synthetic rubber. An elastic member (i.e., a spring 44) is further included between the cap plate 31 and the vent member 43 that elastically biases the vent member 43 downwardly to thereby provide some force against pressure generated in the case 11.

The vent member 43 connects to the anode plate 21 by a tab 12, and the spring 44 electrically connects the vent member 43 and the cap plate 31.

Although not shown in the figures, the vent member 43 may further include a groove or notch that allows the vent member 43 to damage when the internal pressure of the secondary battery 10 exceeds a predetermined pressure.

Figure 4:
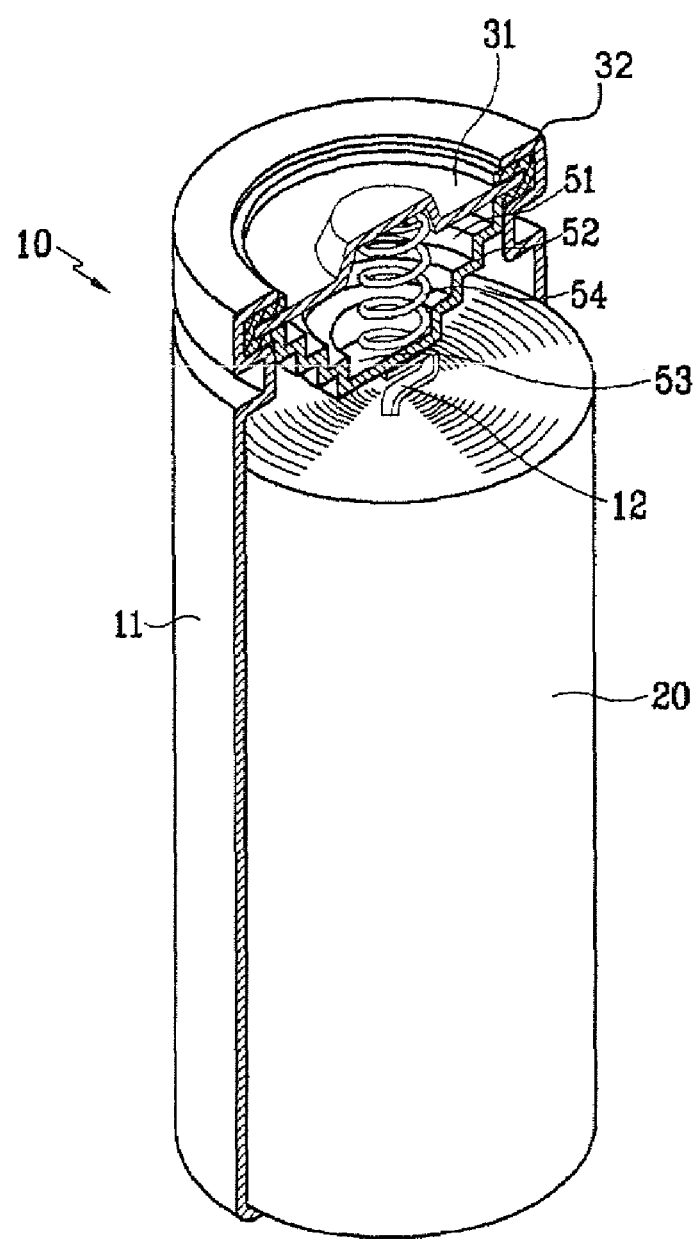
FIG. 4 is a partially cutaway perspective view of a secondary battery according to another embodiment of the present invention.
Figure 5:
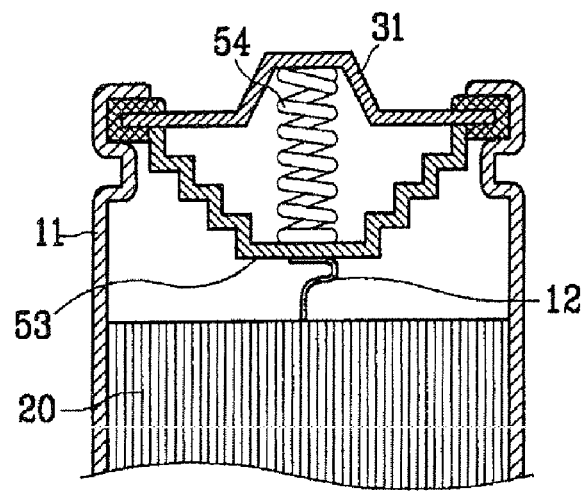
FIG. 5 is a sectional view of a cap assembly shown in FIG. 4.
Figure 6:
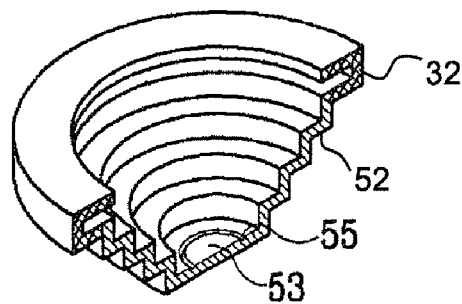
FIG. 6 is a partially cutaway perspective view showing a state where a vent member is integrally formed to a cap assembly.

FIGS. 4, 5, and 6 show another aspect of a cap assembly having a safety assembly. A safety assembly mounted in the cap assembly 30 includes a cap plate 31 connected to a case 11, and a gasket 32 providing insulation between the case 11 and the cap plate 31. The safety assembly also includes a shock absorbing unit 52 extended inwardly from the cap plate 31 into the case and having a space 51 for absorbing pressure, and a vent member 53 supported in a distal end of the shock absorbing unit 52 and that is damaged when an internal pressure of a secondary battery 10 exceeds a predetermined pressure.

A shape of the shock absorbing unit 52 is very similar to that of the shock absorbing unit 32a described above with reference to FIGS. 1, 2, and 3. The shock absorbing unit 52 is formed having creases in an outer circumference thereof to allow for expansion and contraction of the shock absorbing unit 52. If the shock absorbing unit 52 is made of a conductive metal, the vent member 53 and the shock absorbing unit 52 may be integrally formed. Referring to FIG. 6, to allow the vent member 53 to perform its operation, a notch 55 is formed in a lower surface of the shock absorbing unit 52. The anode electrode and the shock absorbing unit 52 are electrically interconnected through a tab 12.

If the shock absorbing unit 52 is formed of metal, since the shock absorbing unit may have a structural strength sufficient for absorbing shock below a predetermined level of pressure, it is not necessary to mount an elastic member (i.e., a spring 54) between the cap plate 31 and the vent member 53. However, the spring 54 may be installed as needed such as when this structure is large with a large capacity battery, such as an HEV battery.

If the secondary battery 10 having a cap assembly as described above is not overcharged, fusion of an organic solvent, a thermal decomposition reaction of an SEI (Solid Electrolyte Interface) of a cathode, a reaction between negative active material and electrolyte, a reaction between oxygen decomposed in a positive active material and electrolyte, and a structural decomposition reaction of a positive active material successively occur.

However, when the secondary battery 10 is overcharged, the above reactions and operations all occur simultaneously, such that the resulting reaction generates heat. When gas is ejected by the decomposition of an SEI film, the secondary battery 10 expands and an interior of the secondary battery 10 becomes gradually less stable as a result of the above electrochemical reactions occurring and by the ejection of gas. The generation of gas continues until the secondary battery 10 ruptures. However, the shock absorbing units 32a and 52 mounted in the cap assembly 30 absorb pressure in the case 11 resulting from the generation of gas while being compressed by this pressure. At this time, since the spring 44 (or 54) is mounted between the cap plate 31 and the vent member 43 (or 53), an absorption resistance with respect to pressure is sufficiently controlled to a level that is within a structural strength of the case 11.

Further, if the internal pressure of the case 11 increases to a level at or above a predetermined pressure as a result of the continued generation of gas, the vent member 43 (or 53) damages so that the pressure in the case 11 escapes. This prevents the explosion and/or fire of the secondary battery 10.

As described above, the safety assembly is able to absorb the pressure in the case 11 by the design of the shock absorbing unit 32a and 52.

In the cap assembly and secondary battery utilizing the same of the invention described above, by providing a safety assembly in the cap plate, safety is improved and the life of the battery is increased. Further, the cap assembly improves safety in large secondary batteries that allow for both charging and discharging. Such a secondary battery of the invention may be effectively used with devices that require high output, such as secondary batteries used in HEVs.

Further, the vent member does not need to be integrally formed to the shock absorbing unit and it is possible to pursue a detachable connection by screw coupling these elements together.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cap assembly for a secondary battery, comprising:
   a cap plate connected to a case having an electrode assembly mounted therein;
   a gasket insulating the cap plate from the case; and
   a safety assembly including a shock absorbing unit extending into the case from the gasket, in a direction away from the cap, being formed of a plurality of stepped creases, and defining a space for absorbing pressure, and a vent member supported by the shock absorbing unit at an end of the shock absorbing unit furthest from the cap plate, wherein the shock absorbing unit absorbs an internal pressure from gas generated in the secondary battery by compressing the space, until the internal pressure exceeds a predetermined pressure, and the vent member damages when the internal pressure of the secondary battery exceeds the predetermined pressure.

2. The cap assembly for secondary batteries of claim 1, wherein the shock absorbing unit is a conical shape having a cutaway apex area, such that the distal end is more narrow than an opposing proximal end thereof.

3. The cap assembly for secondary batteries of claim 2, wherein the plurality of creases allow for expansion and contraction of the shock absorbing unit to absorb the internal pressure.

4. The cap assembly for secondary batteries of claim 2, wherein the gasket and the shock absorbing unit are integrally formed.

5. The cap assembly for secondary batteries of claim 1, wherein the plurality of stepped creases allow for expansion and contraction of the shock absorbing unit to absorb the internal pressure.

6. The cap assembly for secondary batteries of claim 1, wherein the gasket and the shock absorbing unit are integrally formed.

7. The cap assembly for secondary batteries of claim 1, further comprising an elastic member positioned between the cap plate and the vent member to be electrically connected to the same and to elastically bias the vent member in a direction away from the cap plate.

8. A cap assembly for a secondary battery, comprising:
   a cap plate connected to a case having an electrode assembly mounted therein;
   a gasket insulating the cap plate from the case; and
   a safety assembly including a shock absorbing unit extending into the case from the cap plate and that has a space for absorbing pressure and that is made of a conductive metal, and a vent member that is supported by the shock absorbing unit at an end of the shock absorbing unit furthest from the cap plate, and that damages when an internal pressure from gas generated in the secondary battery exceeds a predetermined pressure, wherein the shock absorbing unit is formed of a plurality of stepped creases, and absorbs the internal pressure by compressing the space, until the internal pressure exceeds the predetermined pressure.

9. The cap assembly of claim 8, wherein the shock absorbing unit has a conical shape with a cutaway apex area, such that the distal end is narrower than an opposing proximal end thereof.

10. The cap assembly for secondary batteries of claim 9, wherein the plurality of creases allow for expansion and contraction of the shock absorbing unit.

11. The cap assembly for secondary batteries of claim 9, wherein the shock absorbing unit and the vent member are integrally formed.

12. The cap assembly of claim 8, wherein the plurality of creases allow for expansion and contraction of the shock absorbing unit.

13. The cap assembly for secondary batteries of claim 8, wherein the shock absorbing unit and the vent member are integrally formed.

14. The cap assembly for secondary batteries of claim 8, further comprising an elastic member positioned between the cap plate and the vent member to elastically bias the vent member in a direction away from the cap plate.

15. A secondary battery, comprising:
   an electrode assembly having an anode, a cathode, and a separator;
   a case having a space, mounted on the electrode assembly; and
   a cap assembly having a cap plate connected to the case, a gasket insulating the cap plate from the case, and a safety assembly having a shock absorbing unit extending into the case from the gasket in a direction away from the cap plate, and that has a space for absorbing pressure, and a vent member supported by the shock absorbing unit at an end of the shock absorbing unit furthest from the cap plate, which damages when an internal pressure from gas generated in the secondary battery exceeds a predetermined pressure, wherein the shock absorbing unit is formed of a plurality of stepped creases and absorbs the internal pressure by compressing the space, until the internal pressure exceeds the predetermined pressure.

16. The secondary battery of claim 15, wherein the shock absorbing unit has a conical shape with a cutaway apex area, such that the distal end is narrower than an opposing proximal end thereof.

17. The secondary battery of claim 15, wherein the plurality of stepped creases allow for expansion and contraction of the shock absorbing unit.

18. The secondary battery of claim 15, wherein the gasket and the shock absorbing unit are integrally formed.

19. The secondary battery of claim 18, further comprising an elastic member positioned between the cap plate and the vent member to electrically interconnect these elements and elastically bias the vent member in a direction away from the cap plate.

20. The secondary battery of claim 15, wherein the shock absorbing unit is formed of a conductive metal, and the shock absorbing unit and the vent member are integrally formed.

21. A cap assembly connected to a case holding a secondary battery, the assembly comprising:
a cap plate connected with the case to seal the case;
a safety assembly provided inside the case and comprising,
a shock absorbing unit and,
a vent member supported by an end of the shock absorbing unit farthest from the cap plate,
wherein the safety assembly damages when an internal pressure resulting from gas generated in the secondary battery exceeds a predetermined pressure, allows the gas to escape from the case, and insulates the cap plate from the case, and
wherein the cap assembly is attached with the safety assembly, and the shock absorbing unit extends away from the cap plate, is formed of a plurality of stepped creases, has a sealed space for absorbing pressure, and absorbs the internal pressure by compressing the space, until the internal pressure exceeds the predetermined pressure.

22. The cap assembly of claim 21, further comprising a gasket to insulate the case from the cap assembly, the gasket is connected with the cap plate and the safety assembly.

23. The cap assembly of claim 22, wherein the stepped creases enable the shock absorbing unit to expand and contract due to the internal pressure.

24. The cap assembly of claim 22, wherein the shock absorbing unit is conically shaped and tapered such that the distal end of the shock absorbing unit is narrower than an opposing proximal end thereof.

25. The cap assembly of claim 22, wherein the shock absorbing unit is made of a conductive material, and the vent member and the shock absorbing unit are integrally formed.

26. The cap assembly of claim 22, wherein the gasket and the safety assembly are integrally formed.

27. The cap assembly of claim 21, wherein the vent member includes a groove that allows the vent member to become damaged when the internal pressure of the case exceeds a predetermined pressure.

28. The cap assembly of claim 21, wherein the shock absorbing unit provided inside the case absorbs the internal pressure in the case resulting from the generation of gas such that an absorption resistance corresponding to the internal pressure is controlled to a level that is within a structural strength of the case, thereby preventing the case from exploding.

29. The cap assembly of claim 21, wherein the vent member damages such as to relieve the internal pressure of the case if the internal pressure of the case increases to a level at or above a predetermined pressure level.

30. A pressure absorbing apparatus to relieve an internal pressure inside a case of a rechargeable battery, the apparatus comprising:
a cap plate connected with the case of the rechargeable battery to seal the case;
a shock absorbing unit connected with the cap plate to insulate the cap plate from the case, and having a space to absorb pressure; and
a vent member connected to an end of the shock absorbing unit farthest from the cap plate, wherein the vent member damages when the internal pressure of the case exceeds a predetermined pressure resulting from gas generated by the secondary battery, to allow the gas to escape from the case,
wherein the shock absorbing unit extends away from the cap plate, is formed of a plurality of stepped creases, and absorbs the internal pressure by compressing the space, until the internal pressure exceeds the predetermined pressure.

31. The pressure absorbing apparatus of claim 30, further comprising a gasket to insulate the case from the cap assembly, wherein the gasket is connected with the cap plate and the shock absorbing unit.

32. The pressure absorbing apparatus of claim 31, wherein the stepped creases enable the shock absorbing unit to expand and contract due to the internal pressure.

33. The pressure absorbing apparatus of claim 31, wherein the distal end of the shock absorbing unit is narrower than an opposing proximal end thereof.

34. The pressure absorbing apparatus of claim 33, wherein the vent member comprises a groove that allows the vent member to become damaged when the internal pressure of the case exceeds a predetermined pressure.

35. The pressure absorbing apparatus of claim 31, wherein the shock absorbing unit is formed of a conductive metal, and the shock absorbing unit and the vent member are integrally formed.

36. The pressure absorbing apparatus of claim 31, wherein the gasket and the shock absorbing unit are integrally formed.

* * * * *